United States Patent

[11] 3,599,392

[72] Inventor Eugene E. Geber
 Ossian, Ind.
[21] Appl No. 813,157
[22] Filed Apr. 3, 1969
[45] Patented Aug. 17, 1971
[73] Assignee Franklin Electric Co., Inc.
 Bluffton, Ind.

[54] SHEAR MECHANISM FOR A WRAPPING MACHINE
 7 Claims, 10 Drawing Figs.
[52] U.S. Cl. .................................. 53/210, 53/389
[51] Int. Cl. ...................................... B65b 11/20
[50] Field of Search .......................... 53/210, 221, 228, 389; 83/632

[56] References Cited
UNITED STATES PATENTS
3,491,515  1/1970  Hansen et al. .................. 53/210

Primary Examiner—Theron E. Condon
Assistant Examiner—Robert L. Spruill
Attorney—Hibben, Noyes & Bicknell

ABSTRACT: This application deals with an automatic wrapping machine including a wrapping mechanism for wrapping in a section of thin protective film each article in a series of articles. The wrapping mechanism receives film from a film feed mechanism, loops a section of the film about an article, shears the section of film from the film supply, and seals the film about the article. The mechanism for shearing the film comprises a stationary blade and two movable blades which are engageable with the stationary blade. The two movable blades are supported on joints, and a simplified mechanism is provided to simultaneously shift both movable blades at the proper time in each wrapping cycle to sever the film.

SHEAR MECHANISM FOR A WRAPPING MACHINE

DISCLOSURE

Wrapping machines of the character disclosed in Hansen et al. application Ser. No. 363,954, filed Apr. 30, 1964, and now U.S. Pat. No. 3,432,987 have been provided, including a film feed mechanism for drawing film from a continuous length of film and feeding the film to a wrapping mechanism, the wrapping mechanism receiving the film, looping a section of the film about an article to be wrapped, shearing the section of film from the supply, and sealing the section of film around the article. The means for shearing the film comprises a stationary blade and a pair of blades which are carried by a generally vertically movable elevator and which are horizontally movable relative thereto. The pair of blades thus move generally vertically with the elevator and also move horizontally relative to the elevator and to the stationary blade in order to shear the film. To move the pair of blades horizontally, a cam operated shear drive mechanism extends from the main drive shaft of the wrapping machine to the movable blades. The timing is such that the cam drive mechanism actuates the shear mechanism either while an article is being moved off the elevator or immediately after the article has been moved off the elevator. Another cam operated drive mechanism is provided to move the article off of the elevator.

While the foregoing structure operates well, it has the disadvantage that a shear drive mechanism is required, the sole function of which is to drive the pair of blades. The drive mechanism is somewhat complicated because it must accommodate the generally vertical movement of the blades with the elevator, such movement not being precisely vertical but rather being arcuate. The shear drive mechanism also engages the pair of blades on both sides of the elevator to prevent skewing or binding of the parts.

In accordance with the present invention, the foregoing disadvantages are overcome by mounting a pair of blades such that they may be driven by the drive which moves an article off the elevator, thus permitting elimination of a separate shear drive for this purpose. The shear mechanism comprises a stationary blade, a pair of movable blades, means for mounting the movable blades on the underside of an elevator, the mounting means including a pivotable member which, on pivoting in one direction, shifts the movable blades generally horizontally toward the stationary blade, means responsive to movement of a drive mechanism for pivoting said pivotable member in said one direction, and means for pivoting said pivotable member in the opposite direction after the film has been sheared to return the movable blades to their initial position.

Objects and advantages of the invention will be apparent from the following detailed description taken in conjunction with the accompanying figures of the drawings, in which.

Figure 1:
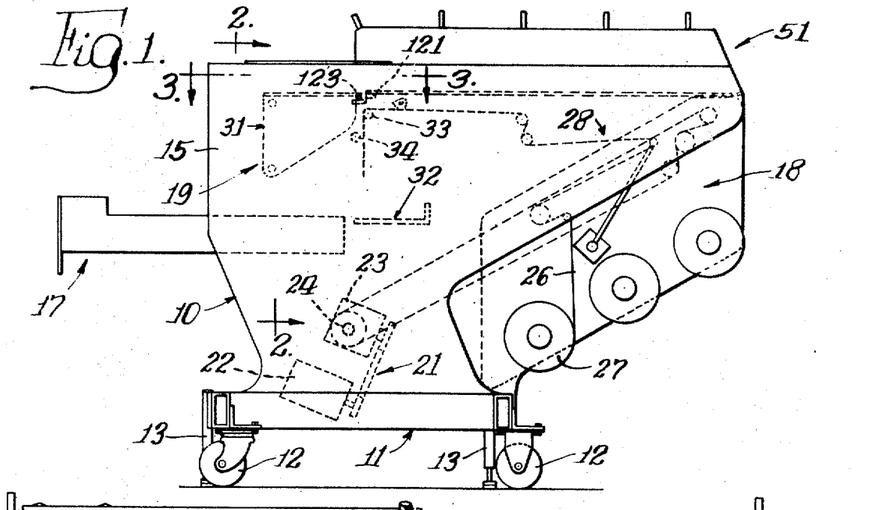
FIG. 1 is a side elevational view of a wrapping machine including a shear mechanism embodying the invention.

With reference to FIG. 1, the wrapping machine comprises a frame 10 which is supported on a base 11, the base 11 in turn being supported on the floor by wheels 12 or adjustable legs 13. The frame 10 includes a pair of laterally spaced, vertically extending sideplates 14 and 15 (FIGS. 1 and 2), an article infeed conveyor 17, a film feed mechanism 18, a wrapping and sealing mechanism 19, and a drive 21 for the various mechanisms of the wrapping machine. The main drive 21 comprises a drive motor 22, which is normally continuously energized while the machine is in operation, the drive motor 22 being connected through a belt and gear speed reducer 23 to a main drive shaft 24 of the wrapping machine.

The film feed mechanism may be of the character disclosed in the previously mentioned Hansen et al. application, or of the character disclosed in the copending Hansen et al. application Ser. No. 813,150, filed Apr. 3, 1969, such a film feed mechanism being adapted to feed film 26 from a supply roll 27 through a film feed and tensioning mechanism 28 to the wrapping mechanism 19.

Figure 4:
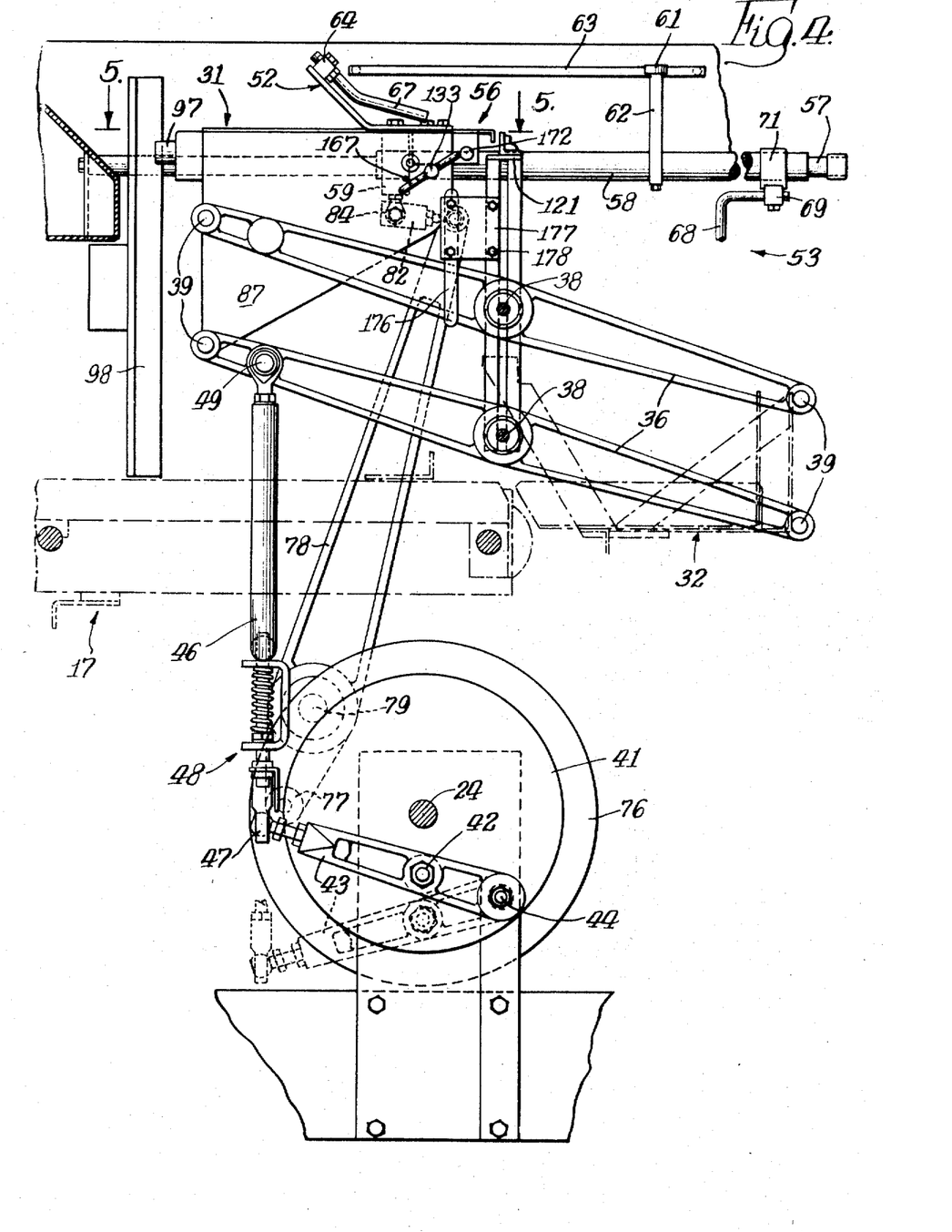
FIG. 4 is a fragmentary sectional view taken on the line 4-4 of FIG. 3.

With reference to FIGS. 1 and 4, the wrapping mechanism includes an upper elevator 31, a lower elevator 32, a draper roll 33, and a dancer roll 34. The two elevators 31 and 32 are pivotally mounted on the outer ends of two pairs of parallel arms 36 and 37 (FIGS. 2 and 4), the pair of arms 36 being at one side of the machine and the pair of arms 37 being at the opposite side of the machine. Each of the arms 36 and 37 is pivotally mounted at approximately its center on the adjacent side plate by a pin 38, and the outer ends of the arms 36 and 37 are pivotally connected to opposite sides of the elevators 31 and 32 by pins 39. By this parallel arm arrangement, reciprocating movements of the arms 36 and 37 about the axes of the pins 38 causes the two elevators 31 and 32 to swing upwardly and downwardly in arcuate paths.

Figure 2:
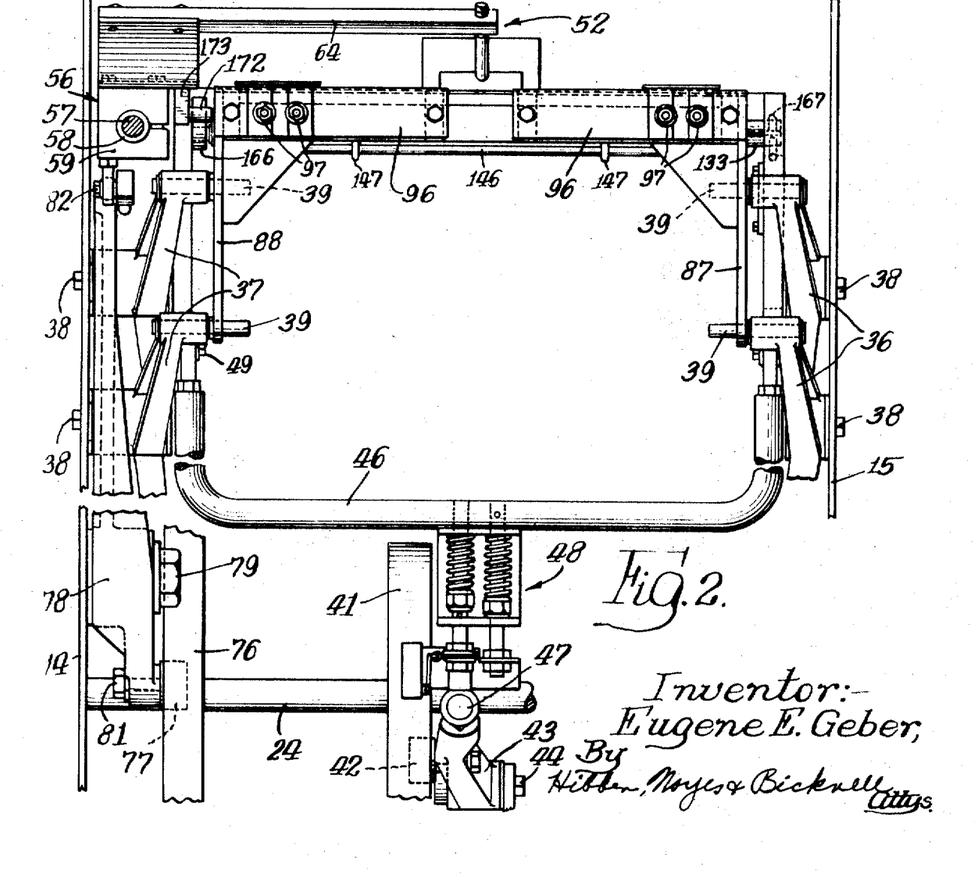
FIG. 2 is a fragmentary enlarged view taken on the line 2-2 of FIG. 1.

The arms 36 and 37 are driven in such movement by a cam operated elevator drive connected to the main drive shaft 24 of the wrapping machine. With reference to FIGS. 2 and 4, a cam 41 is secured to the main drive shaft 24, the cam 41 having a groove formed in one face thereof, which receives a cam follower 42. The follower 42 is pivotally connected to an arm 43 at a point intermediate the ends of the arm 43. One end of the arm 43 is pivotally connected to the frame of the machine by a pin 44, and the other end of the arm 43 is pivotally connected to a link 46 by a joint 47. Intermediate the joint 47 and the link 46 is a safety switch mechanism 48 which automatically turns the drive motor 22 off in the event the machine is jammed. The link 46 is U-shaped and has its center portion connected to the safety mechanism 48 and its arms extending upwardly and pivotally connected to the lower of each pair of arms 36 and 37 by pins 49 (FIG. 4). By this construction, turning movement of the drive shaft 24 and the cam 41 causes pivotal movement of the arm 43 on the pin 44 between the full and dashed line positions shown in FIG. 4. Such pivotal movement of the arm 43 causes generally vertical movement of the link 46. When the arm 43 is in its uppermost position, shown in full lines in FIG. 4, the elevators 31 and 32 are in vertically displaced positions, and when the arm 43 is in its lowermost position, the two elevators 31 and 32 are in intermediate positions where they are generally horizontally aligned.

During a wrapping cycle, an article to be wrapped is pushed by the infeed conveyor 17 onto the lower elevator 32 when the two elevators 31 and 32 are in their vertically displaced positions. When the two elevators are subsequently moved to their horizontally aligned positions, the article is pushed from the lower elevator 32 to the upper elevator 31. When the elevators are subsequently moved to their vertically displaced positions, the article on the elevator 31 is pushed toward the right as seen in FIG. 4, to an end folding and sealing mechanism 51 (FIG. 1). By the foregoing movements of the two elevators 31 and 32 and the transfer of the article between the elevators and to the end folding and sealing mechanism 51, a section of the film 26 is wrapped about the article, as described in greater detail in application Ser. No. 363,954.

To transfer an article from one elevator to the other and then to the mechanism 51, an upper pusher 52 and a lower pusher 53 (FIGS. 3 and 4) are moved alternately toward the right and toward the left in timed relation with the movement of the elevators. The two pushers 52 and 53 are carried by a carriage 56 which is slidably mounted on a horizontal longitudinally extending shaft 57 located at one side of the machine between the elevators and the side plate. The carriage 56 includes a tube 58 which is slidably positioned on the shaft 57, and a mounting block 59 which is secured to the tube 58. As shown in FIG. 4, the shaft 57 is fastened to the frame of the machine, and it is sufficiently long relative to the tube 58 that the tube 58 may be slid longitudinally of the machine on the shaft 57 between a rearwardly disposed position and a forwardly disposed position, the forwardly disposed position being shown in FIGS. 3 and 4. The upper pusher 52 sweeps across the upper elevator 31 and the lower pusher 53 sweeps across the lower elevator 32 during such movements of the carriage 56. To prevent turning movement of the tube 58 on the shaft 57, a pair of guide rollers 61 (FIGS. 3 and 4) are rotatably fastened to the upper end of a support 62, the two rollers 61 being laterally spaced apart and positioned on opposite sides of the guide track 63 which extends longitudinally of the machine above the shaft 57.

Figure 3:
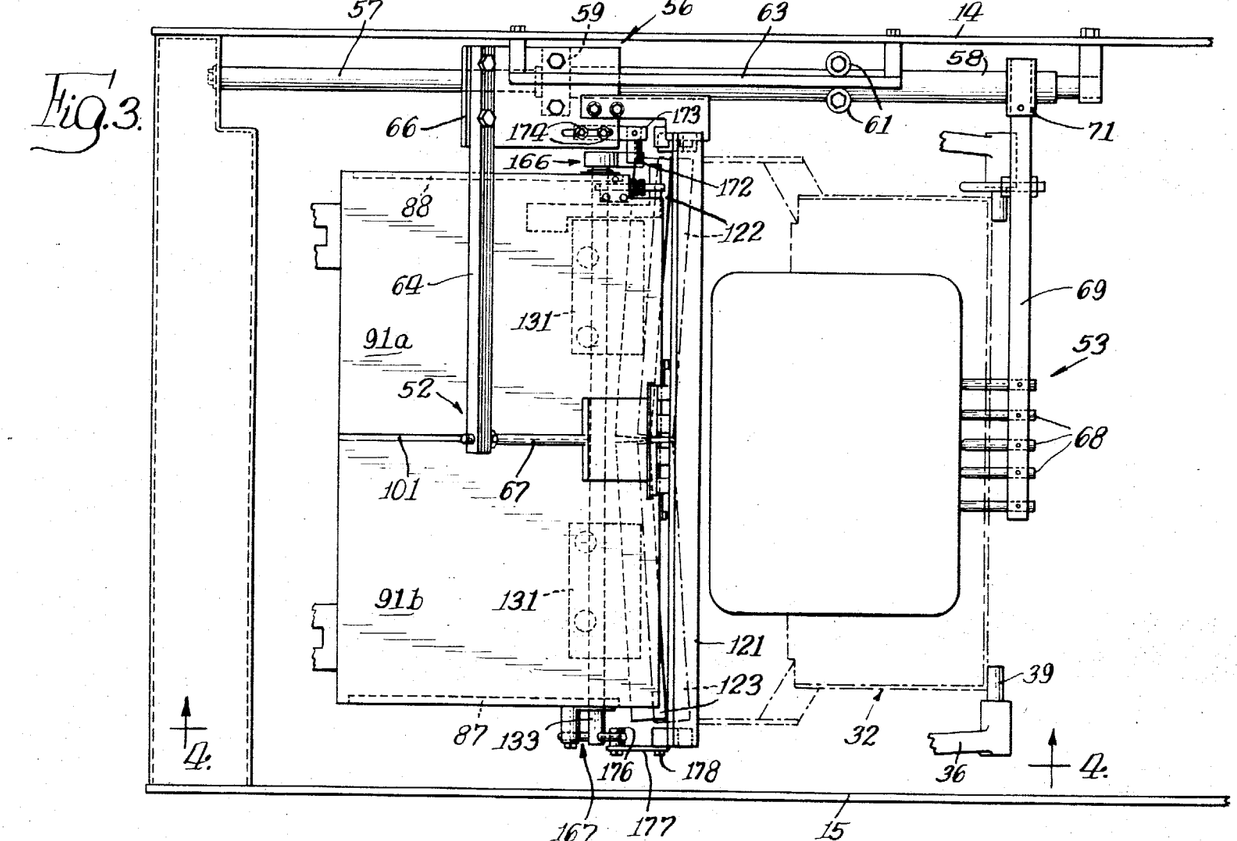
FIG. 3 is another enlarged fragmentary view taken on the line 3-3 of FIG. 1.

With reference to FIGS. 3 and 4, the upper pusher 52 is fastened to the carriage 56 by an arm 64 which extends laterally inwardly from the carriage 56 to a location over the center of the upper elevator 31. To fasten the arm 64 to the carriage 56, the carriage further includes a plate 66 which is bolted to the upper surface of the block 59. Fastened to the inner end of the arm 64 is a pusher finger 67 which angles downwardly and forwardly from the arm 64 to a location which is closely adjacent the upper surface of the elevator 31 when the elevator 31 is in its uppermost position.

The lower pusher 53 comprises a plurality of fingers 68 arranged in a rakelike configuration on the inner end of a laterally extending arm 69. The outer end of the arm 69 is fastened by a clamp 71 (FIGS. 3 and 4) to the forward, or right as seen in these figures, end portion of the tube 58. The fingers 68 on the lower pusher 53 are located such that they sweep across the upper surface of the lower elevator 32 when the two elevators 31 and 32 are at their horizontally aligned, intermediate positions.

To move the carriage 56 longitudinally of the machine in a reciprocating motion and in timed relation with the movement of the two elevators 31 and 32, the carriage 56 is connected by a pusher drive mechanism to be driven from the main drive shaft 24. With reference to FIGS. 2 and 4, the psher drive mechanism comprises a cam 76 which is secured to the main drive shaft 24, a cam follower 77 which engages a cam groove formed in the face of the cam 76, and an arm 78 which is pivotally mounted on the frame of the machine by a pin 79 at a location intermediate the ends of the arm 78. The cam follower 77 is pivotally connected by a pin 81 to the lower end of the arm 78, and the upper end of the arm 78 is pivotally connected to the block 59 by a joint 82 (FIGS. 2 and 4). Thus, turning movement of the drive shaft 24 and the cam 76 results in swinging movement of the arm 78 on the axis of the pin 79 and reciprocating movement of the carriage 56. The cams 76 and 41 are angularly positioned relative to each other on the shaft 24 such that the carriage 56 is moved forwardly from its rearwardmost position immediately after the two elevators have been moved to their vertically displaced positions. The carriage is moved rearwardly from its forwardmost position immediately after the two elevators 31 and 32 have been shifted to their intermediate, horizontally aligned positions. Thus, an article on the upper elevator 31 will be pushed forwardly to the end folding and sealing mechanism 51 by the upper pusher 52 from the upper elevator, and an article on the lower elevator 32 will be pushed by the lower pusher 53 from the lower elevator 32 to the upper elevator 31 when the two elevators are at their horizontally aligned positions.

Figure 5:
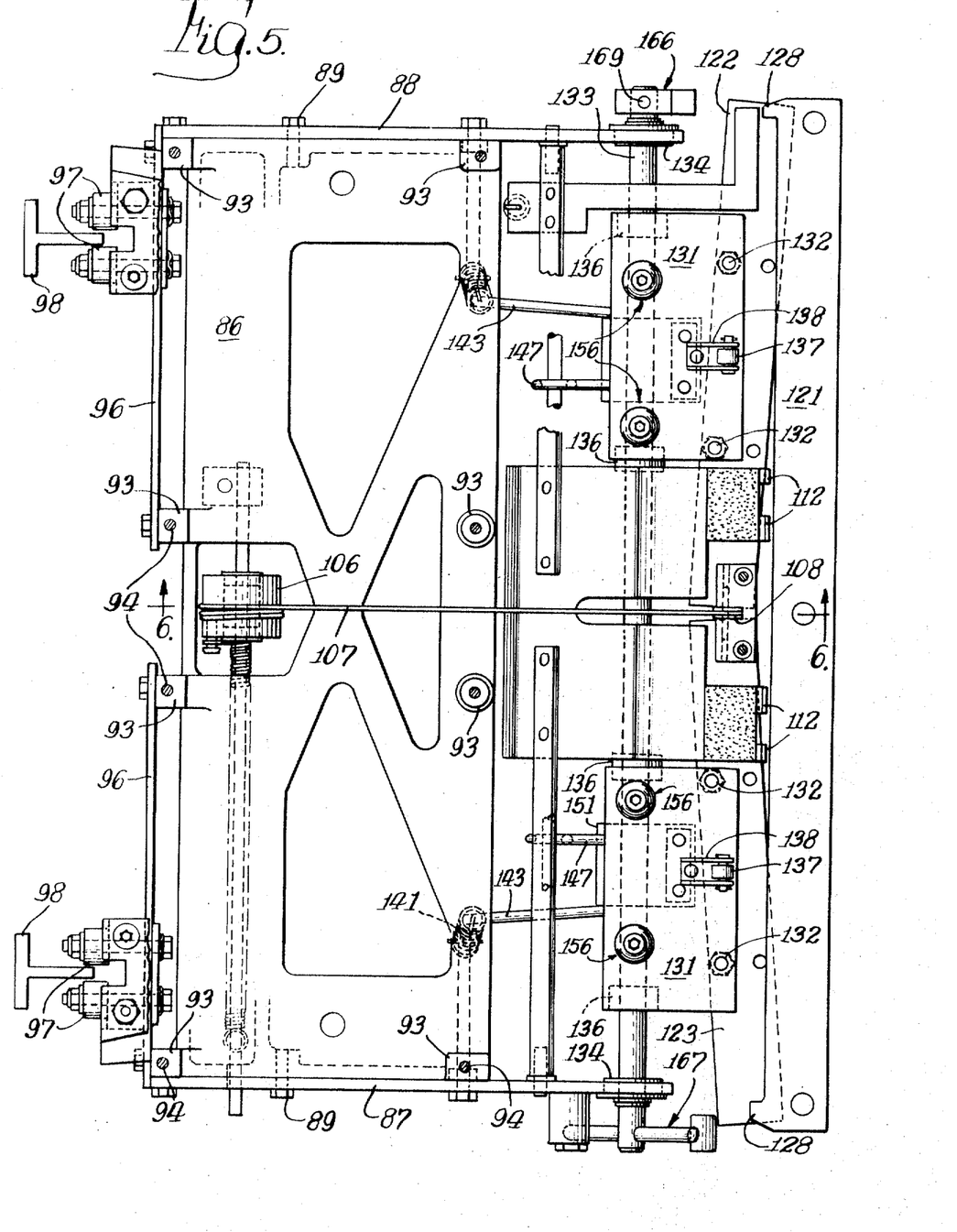
FIG. 5 is a further enlarged fragmentary view taken on the line 5-5 of FIG. 4.
Figure 6:
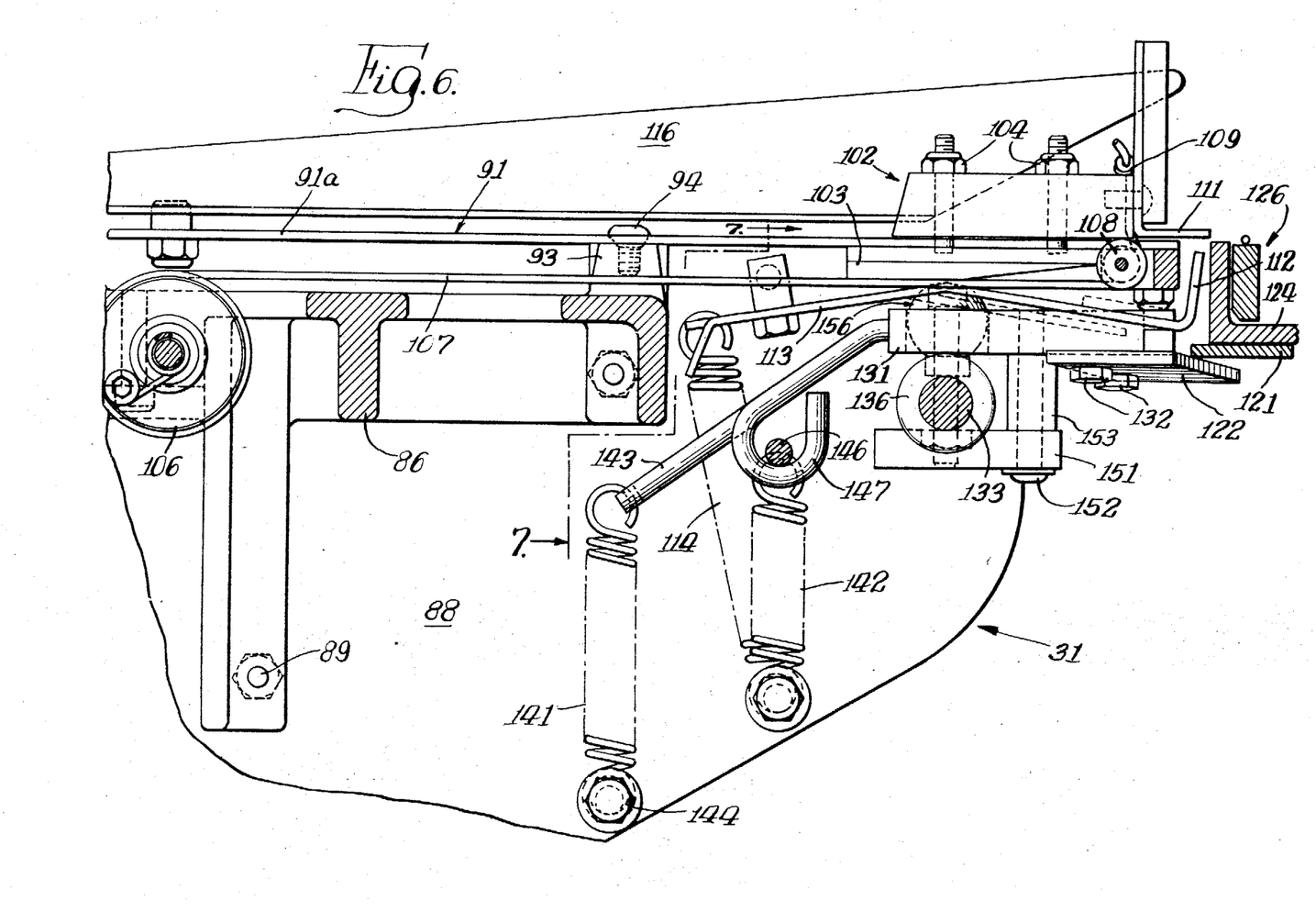
FIG. 6 is a still further enlarged fragmentary sectional view taken on the line 6-6 of FIG. 5.

With particular reference to FIGS. 4 to 6, the upper or top elevator 31 comprises a frame in the form of a casting 86, two vertically extending side plates 87 and 88 which are secured to the frame 86 by bolts 89, and a top plate 91 (FIG. 6), consisting of two sections 91a and 91b. The frame 86 extends generally horizontally and the two side plates 87 and 88 are secured to the sides of the frame 86 and are pivotally connected to the rearward ends of the parallel arms 36 and 37 by the pins 39 as shown in FIG. 4. Upwardly extending bosses 93 are formed on the upper side of the frame 86, and the two sections 91a and 91b of the top plate are fastened to the bosses 93 as by screws 94. Secured to the rearward side of the frame 86 are a pair of rear plates 96, such plates 96 having guide rollers 97 rotatably connected thereto. Associated with each pair of guide rollers 97 is a vertical guide 98, each guide having an arm which extends between a pair of rollers 97 and guides the movement of the top elevator 31 as it swings upwardly and downwardly.

As shown in FIG. 6, the two sections 91a and 91b of the top plate 91 extend forwardly from the forward edge of the frame 86, and the adjacent edges of the two sections 91a and 91b are spaced a short distance apart to form a gap indicated by the numeral 101 in FIG. 3. A longitudinally movable receiver bar 102 is fastened to the top elevator 31 and is guided in its forward and rearward movement by a retainer 103 which is positioned on the underside of the plate 91. A pair of bolts 104 connect the receiver bar 102 and the retainer 103 together, the bolts 104 extending through the gap 101 and preventing lateral movement of the receiver bar 102. The receiver bar 102 is constantly urged in the forward direction by a spring biased reel 106 (FIGS. 5 and 6) which is rotatably mounted on the underside of the frame 86 adjacent the rear edge thereof. A cord 107 extends forwardly from the reel 106 between the frame 86 and the top plate 91, around an idler roller 108, and to the receiver bar 102, and is fastened to the bar 102 as at 109. The spring tension on the reel 106 tends to wind the cord 107 on the reel and thus pull the receiver bar 102 forwardly. An angle plate 111 is fastened to the forward side of the receiver bar 102 and engages an article being wrapped while the article is on the upper elevator 31.

To prevent an article from being pulled accidentally off from the forward edge of the upper elevator 31 during a wrapping cycle, a plurality of retractable fingers 112 are pivotally mounted on the elevator 31. The fingers 112 are formed on the forward edge of a plate 113 which is pivotally connected to the upper elevator 31, and a tension spring 114 urges the plate 113 in the counterclockwise direction as seen in FIG. 6. Suitable trip mechanism are provided to hold the fingers 112 in retracted positions, shown in FIG. 6, while an article is being pushed on or off the upper elevator 31, and to hold the fingers 112 in upwardly projecting positions where they extend above the upper surface of the plate 91 while the elevator is moving upwardly.

Also mounted on the elevator 31 are a pair of laterally spaced end folders which tuck the film against the sides of an article as the article is being moved onto the upper elevator 31.

For the sake of simplicity in the drawings, the end folders 16, the guide rollers 97 and guides 98, and certain other members, are not illustrated in all of the figures of the drawings.

As previously mentioned, when the upper elevator 31 reaches its uppermost position, shown in FIGS. 1, 4 and 6, an article on the upper elevator is pushed forwardly to an end folding and sealing mechanism. As soon as the article is off the elevator, or while the article is still being moved forwardly, a shear mechanism embodying the present invention is employed to sever the section of film which has been looped about the article during the wrapping operation. The shear mechanism includes a stationary blade 121 and two movable blades 122 and 123. With particular reference to FIGS. 4 to 6, the stationary blade 121 is secured to a laterally extending angle 124 of the frame as by bolts, the angle 124 further serving to support a tack sealer 126. The stationary blade 121 is preferably mounted on the angle 124 such that its center section bows downwardly slightly, as indicated or shown in FIG. 6, and this may be accomplished, for example, by fastening the outer ends of the stationary blade 121 rigidly against the angle 124 but positioning a spacer or washer between the center portion of the stationary blade 121 and the angle 124. As shown in FIG. 5, the stationary blade 121 has rearwardly extending tangs 128 formed thereon at its ends, which catch the outer ends of the movable blades 122 and 123 when the upper elevator 31 moves upwardly to its uppermost position, as will be explained hereinafter. Both the upper and lower edges on the rearward side of the movable blade 121 are preferably sharpened so that the blade 121 may be turned over when one edge becomes dull.

Figure 8:
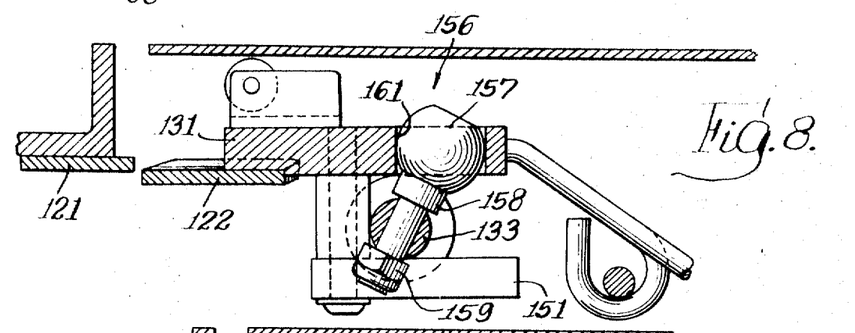
FIG. 8 is a fragmentary sectional view taken on the line 8-8 of FIG. 7.
Figures 9, 10:
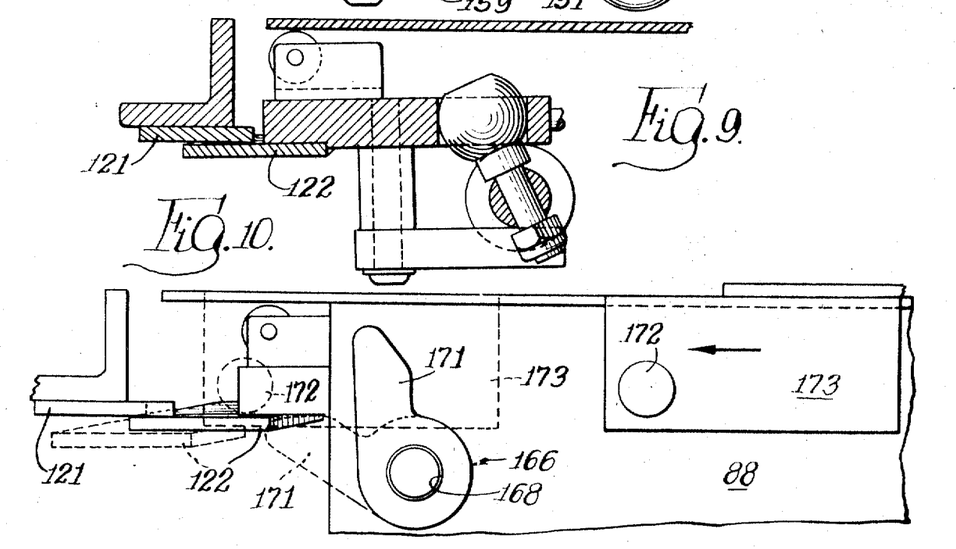
FIG. 9 is a view similar to FIG. 8 but showing a different position of the parts.
FIG. 10 is a fragmentary view taken on the line 10-10 of FIG. 7.

The two movable blades 122 and 123 are mounted on the upper elevator 31 for movement between a retracted or rearward position shown in FIG. 8, and an extended or forward position shown in FIG. 9. Each of the blades 122 and 123 is secured to a mounting plate 131 as by bolts 132 (FIG. 5), and the surface of each plate 131, which engages the associated blade, is slanted (see FIG. 6) so that, even though the plate 131 is positioned in a horizontal plane, each blade will slope slightly downwardly and forwardly from its inner end, as shown in FIGS. 5 and 6. Such mounting of the blades 121, 122 and 123 is advantageous because it results in point contact between the stationary blade and each movable blade as the movable blades are moved forwardly relative to the stationary blade 121, thereby effectively cutting the film in a scissors action.

Figure 7:
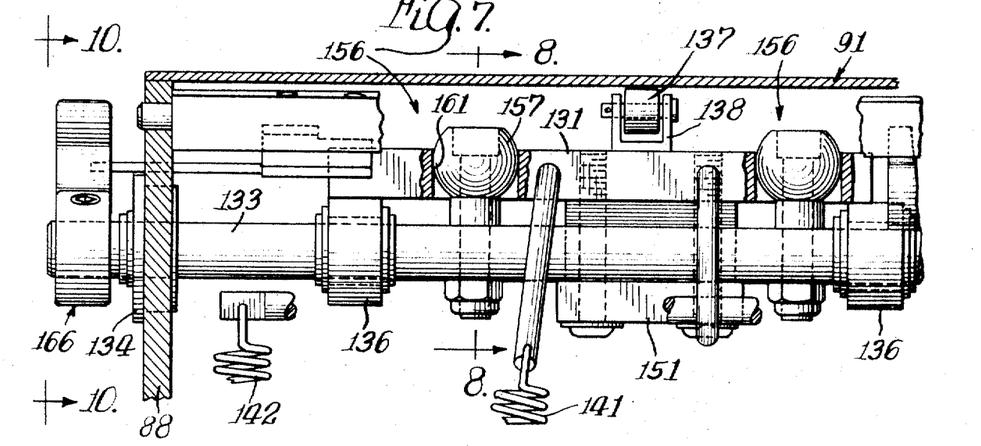
FIG. 7 is a fragmentary sectional view taken on the line 7-7 of FIG. 6.

The two plates 131 are pivotally mounted on a laterally extending pivot shaft 133 (FIGS. 5 to 9), the pivot shaft 133 being pivotally mounted on the two sideplates 87 and 88 of the elevator by bearings 134, adjacent the forwardmost edges of the two sideplates. To support the mounting plates 131, a pair of rollers 136 are fastened on the shaft 133 below each plate, each plate 131 resting on the upper surfaces of the associated rollers 136. On the upper side of each plate 131, adjacent the forward edge thereof and in between the associated pair of rollers 136, is provided an upper roller 137 which is rotatably supported on the upper surface of the plate 131 by a U-shaped bracket 138. As shown in FIG. 7, the rollers 137 engage the underside of the top plate 91 only when the two movable blades are out of engagement with the stationary blade 131. When the movable blades are in engagement with the stationary blade, the rollers 137 are displaced downwardly slightly from the top plate 91.

As best shown in FIGS. 5 and 6, to the rearward edge of each blade mounting plate 131 is attached a plurality of tension springs 141 and 142. A spring rod 143 is threaded into the rearward edge of each plate 131 and angles rearwardly and downwardly therefrom as shown in FIG. 6, and a tension spring 141 is connected to the rearward end of the rod 143 and anchored as at 144 on the adjacent sideplate of the upper elevator. A second spring rod 147 is connected to each plate 131 and angles downwardly and rearwardly therefrom. A laterally extending rod 146 is positioned at a location which is spaced rearwardly and downwardly from the rear edge of the plates 131, and a pair of tension springs 142 are attached to the outer ends of the rod 146. The spring rod 147 for each of the plates 131 is connected to the rod 146 as shown in FIG. 6. As shown in FIG. 5, the two spring rods 143 and 147 for each mounting plate 131 are laterally spaced and are located between the rollers 136 and on opposite sides of the roller 137. With reference to FIG. 6, it will be apparent that the springs 141 and 142 tend to pivot the two plates 131 in the counterclockwise direction on the upper surfaces of the rollers 136, and during a severing operation they hold the movable blades 122 and 123 in engagement with the stationary blade 121.

Each of the plates 131 also has a bracket 151 (FIG. 6) fastened thereto, each bracket 151 being connected to the associated plate by a pair of screws 152. A spacer 153 is positioned between each bracket 151 and the associated plate 131 in order to hold the bracket 151 spaced downwardly therefrom, the length of the spacer 153 being such that the bracket 151 extends under the pivot shaft 133 and closely adjacent thereto.

To move the two blades 122 and 123 forwardly in order to sever the film, and subsequently to move the two blades rearwardly in preparation for the next severing operation, each plate 131 is connected by two joints 156 (FIGS. 6 through 9) such that the plate is moved longitudinally of the machine in response to pivotal movement of the pivot shaft 133. With particular reference to FIGS. 7, 8 and 9, each joint 156 comprises a ball 157, a spacer 158, and a bolt 159. Each ball 157 is positioned in a vertically extending circular hole 161 formed in the plate 131, and each ball 157 is secured to the pivot shaft 133 by the bolt 159, the spacer 158 being positioned between the ball 158 and pivot shaft 133. As shown in FIGS. 7 to 9, the hole 161 preferably has straight sides so that the ball 157 is free to slide vertically in the associated hole 167.

FIG. 8 shows the location of the joints 156 and the movable blades 122 and 123 at the beginning of a severing operation, where it will be noted that the outer ends of the stationary blade 121 overlaps the outer ends of the movable blades 122 and 123, FIG. 9 shows the positions of these parts at the ends of the severing operation, and FIGS. 5 and 6 show the position of these parts at a position which is intermediate the positions shown in FIGS. 8 and 9. With reference to FIGS. 8 and 9, pivotal movement of the shaft 133 in the counterclockwise direction results in swinging movement of the balls 158 toward the left and horizontal movement toward the left, or forwardly, of the plates 131. Subsequent turning movement of the pivot shaft 133 in the clockwise direction results in rearward horizontal movement of the plates 131.

To pivot the shaft 133 in timed relation with the movement of the other parts of the machine, a trip cam 166 (FIGS. 5, 7 and 10 is secured to one end of the pivot shaft 133 and a return cam 67 (FIGS. 4 and 5) is secured to the opposite end of the pivot shaft 133. As shown in FIG. 3, the trip cam 166 is located on the side of the machine, which is adjacent the carriage 56 and the return cam 167 is located on the opposite side. The trip cam 166 has a hole 168 formed therethrough which receives the shaft 133, the cam 166 being secured to the shaft 133 as by a setscrew 169 (FIG. 5), and the trip cam 166 has a finger 171 (FIG. 10) formed thereon which is engageable by a trip pin 172 carried by the carriage 56. The trip pin 172 is fastened to a trip block 173 which in turn is fastened to the plate 66 of the carriage 56 by bolts 174 (FIG. 3). An elongated, longitudinally extending slot is formed in the plate 66 and the bolts 174 extend through the elongated slot so that the position of the pin 172 may be adjusted longitudinally of the machine relative to the carriage 56.

As shown in FIGS. 2 and 3, the trip pin 172 extends laterally inwardly from the carriage 56 to a location where it sweeps over the trip cam 166. When the finger 171 is generally vertically disposed as shown in FIG. 10, the pin 172 engages the finer 171 and rotates the cam 166, and the pivot shaft 133, in the counterclockwise direction as seen in FIG. 10. Such pivotal movement shifts the two movable blades longitudinally toward the left as seen in FIG. 10, as previously explained.

The return cam 167 is provided to retract the movable blades 122 and 123 in the rearward direction after the film has been severed. The return cam 167 is an elongated pin which is positioned through a hole formed in the shaft 133 and is secured thereto. Fastened by a plate 177 and a plurality of bolts 178 to the frame of the machine is a stationary vertically extending finger 176 (FIGS. 3 and 4) which is located in the path of the forward end of the return cam 167 as the upper elevator moves downwardly from its uppermost position. With reference to FIG. 4, after a severing operation, the return cam 167 is disposed at a forwardly and upwardly sloping angle, and the forward end of the cam 167 extends over the finger 176. As the upper elevator 31 swings downwardly, the forward end of the cam 167 strikes the upper end of the finger 176, and continued downward movement of the upper elevator 31 causes the return cam 167, and the shaft 133, to pivot in the counterclockwise direction as seen in FIG. 4, and then the upper end of the cam 167 slides along the rearward surface of the finger 176 with continued movement of the elevator. Such pivotal movement of the shaft 133 of course retracts the movable blades 122 and 123, and the blades remain in their retracted positions during subsequent movement of the upper elevator 31 to its uppermost position.

To summarize briefly the operation of the wrapping machine and the shear mechanism, when the two elevators 31 and 32 are in their intermediate positions an article to be wrapped is transferred from the lower elevator to the top elevator by the pusher 53. By this transfer, a section of film is looped over the rearward edge of the article. Subsequent movement of the two elevators to their vertically displaced positions results in looping of the section of film across the top side of the article. As the upper elevator 31 approaches its uppermost position, the laterally outer corners of the two movable blades 122 and 123 engage the undersides of the tangs 128 of the stationary blade 121, thus preventing further upward movement of the two movable blades. When the upper elevator 31 reaches its uppermost position, the two movable blades are in engagement with the tangs and the two upper rollers 137 are spaced downwardly slightly from the top plate 91. The tension springs 141 and 142 hold the movable blades 122 and 123 tightly in engagement with the stationary blade 121, and each plate 131 is supported on the two rollers 136.

Immediately after the upper elevator 31 reaches its uppermost position, the carriage 56 is moved forwardly, resulting in the upper pusher 52 engaging the receiver bar 102 and pushing the article forwardly off of the upper elevator 31 and to the end folding and sealing mechanism. In the present construction, the pin 172 is located to engage the finger 171 and actuate the shear mechanism to sever the film when the article is nearly off the elevator but while the article is still moving. Actuation of the shear mechanism is accomplished by the pin 172 engaging the finger 173 and pivoting the pivot shaft 133 in the clockwise direction as seen in FIG. 6, causing the two blades 122 and 123 to shift forwardly. In the present construction the total movement of the blades 122 and 123 is approximately three-fourth inch. The inclination of each movable blade causes it to be in point contact only with the stationary blade 121, the point of contact being at the sharp adjacent edges of the blades. As the movable blades move forwardly, such point of contact travels laterally inwardly from the outer end to the inner end of each movable blade. At the beginning of a severing operation, a line drawn between the point of contact for each movable blade, and the point of connection between the rod 146 and the associated spring rod 147, passes between the associated pair of rollers 136. The force of the springs 142 thus holds the plate 131 firmly against the rollers 136 and prevents tilting of the associated movable blade. On the other hand, at the completion of a severing operation a similar line drawn from the point of contact to the spring 141 also passes between the pair of rollers 136, and the spring 141 holds the plate 131 firmly against the rollers 136. Thus, the springs 141 and 142 combine to hold each plate and movable blade in proper position.

After the film has been sheared, the two movable blades remain in their forwardly disposed positions while the article is completely moved off the upper elevator and while the upper elevator begins its downward movement. Such downward movement of the upper elevator causes the return cam 167 to engage the finger 176, resulting in pivotal movement of the cam 167 and the pivot shaft 133 in the counterclockwise direction as seen in FIG. 6 and return of the movable blades to their retracted positions. As soon as the upper elevator begins its downward movement, the movable blades 122 and 123 move downwardly out of engagement with the stationary blade 121 and the plates 131 pivot slightly in the counterclockwise direction as seen in FIG. 6 until the rollers 137 engage the underside of the top plate 71. As the pivot shaft 133 pivots to retract the blades, the plates 131 and 132 roll on the upper surface of the two rollers 136 and 137 and the roller 137 rolls on the plate 71.

It will therefore be apparent that a novel and useful shear mechanism for a wrapping machine has been provided. The shear mechanism is advantageous in that it permits the elimination of a separate cam drive to actuate it, and the shear blades are longitudinally moved by simple pivotal movement of a shaft.

I claim:

1. In a wrapping machine including a frame, a generally vertically movable elevator mounted on said frame and adapted to receive an article to be wrapped in a section of film, the improvement of a mechanism for severing the film comprising a horizontal stationary blade adapted to be fastened to the frame, at least one movable blade adapted to cooperate with said stationary blade in a shearing action, a pivot member adapted to be pivotally mounted on said elevator, and means connecting said movable blade with said pivot member such that pivoting movement of said pivot member imparts generally horizontal movement to said movable blade to effect said shearing action, said connecting means comprising a support for said movable blade, and a joint connecting said pivot means with said support, said joint comprises a first part fastened to said pivot means and radially spaced from the axis of pivotal movement of said pivot means, and a second part on said support means, said first and second parts being angularly movable relative to each other.

2. In a wrapping machine including a frame, a generally vertically movable elevator mounted on said frame and adapted to receive an article to be wrapped in a section of film, the improvement of a mechanism for severing the film comprising a horizontal stationary blade adapted to be fastened to the frame, at least one movable blade adapted to cooperate with said stationary blade in a shearing action, a pivot member adapted to be pivotally mounted on said elevator, and means connecting said movable blade with said pivot member such that pivoting movement of said pivot member imparts generally horizontal movement to said movable blade to effect said shearing action, said connecting means comprising a support for said movable blade, and a joint connecting said pivot means with said support, and further including a plurality of rollers positioned on the upper and lower sides of said support for guiding said support during said generally horizontal movement.

3. Apparatus as in claim 2, wherein said rollers positioned on the lower side of said support are carried by said pivot means.

4. In a wrapping machine including a frame, a generally vertically movable elevator mounted on said frame and adapted to receive an article to be wrapped in a section of film, the improvement of a mechanism for severing the film comprising a horizontal stationary blade adapted to be fastened to the frame, at least one movable blade adapted to cooperate with said stationary blade in a shearing action, a pivot member adapted to be pivotally mounted on said elevator, and means connecting said movable blade with said pivot member such that pivoting movement of said pivot member imparts generally horizontal movement to said movable blade to effect said shearing action, and further including means for pivoting said pivot member comprising movable drive means including a member movable relative to said elevator and to said pivot member, said drive means on movement thereof engaging said pivot member and pivoting said pivot member, said drive means being operable to pivot said pivot member in one direction such as to move said movable blade toward said stationary blade, and further including return means adapted to be attached to said frame and to pivot said member for pivoting said pivot member in the other direction on downward movement of said elevator and said pivot member.

5. Apparatus as in claim 4, wherein said drive means is located adjacent one side of the frame and said return means is located adjacent the other side of the frame.

6. In a wrapping machine including a frame, a generally vertically movable elevator mounted on said frame and adapted to receive an article to be wrapped in a section of film, the improvement of a mechanism for severing the film comprising a horizontal stationary blade adapted to be fastened to the frame, at least one movable blade adapted to cooperate with said stationary blade in a shearing action, a pivot member adapted to be pivotally mounted on said elevator, and means connecting said movable blade with said pivot member such that pivoting movement of said pivot member imparts generally horizontal movement to said movable blade to effect said shearing action, said connecting means comprising a plate having said movable blade secured thereto, and further including a pair of supports in spaced apart supporting engagement with the underside of said plate, and spring means engaging said plate and urging said movable and stationary blades into engagement, said movable and stationary blades being relatively inclined so that they make substantially point contact only, and said pair of supports and said spring means being located so that a line drawn between said point and said spring means passes between said pair of supports.

7. Apparatus as in claim 6, wherein said spring means comprises a pair of tension springs.